United States Patent [19]

Cremers et al.

[11] Patent Number: 5,742,236
[45] Date of Patent: Apr. 21, 1998

[54] ELECTRONIC CODE LOCKING MECHANISM, ESPECIALLY THE DEACTIVATION OF A MOTOR DRIVE INTERLOCK

[75] Inventors: Rolf Cremers, Marxzell; Wolfgang Ziegler, Karlsbad, both of Germany

[73] Assignee: Valeo Borge Instruments GmbH & Co. KG, Remchingen, Germany

[21] Appl. No.: 401,714

[22] Filed: Mar. 10, 1995

[30] Foreign Application Priority Data

Mar. 10, 1994 [DE] Germany .................. 44 07 966.4

[51] Int. Cl.$^6$ .................................... B60R 25/04
[52] U.S. Cl. .................. 340/825.31; 70/278; 70/460; 180/287; 235/382.5; 307/10.5; 340/426; 340/825.34
[58] Field of Search .............. 70/277, 278, 395, 70/408, 460; 180/287; 235/382, 382.5; 307/10.2, 10.3, 10.5, 10.6; 340/426, 542, 825.31, 825.34, 825.69, 825.72; 361/172; 380/46, 52

[56] References Cited

U.S. PATENT DOCUMENTS

| | | | |
|---|---|---|---|
| 3,732,465 | 5/1973 | Palmer | 317/134 |
| 4,042,970 | 8/1977 | Atkins | 361/172 |
| 4,189,712 | 2/1980 | Lemelson | 340/825.31 |
| 4,366,466 | 12/1982 | Lutz | 340/825.31 X |
| 4,451,887 | 5/1984 | Harada et al. | 364/424 |
| 5,019,812 | 5/1991 | Gostahagberg et al. | 340/825.31 |
| 5,311,757 | 5/1994 | Spahn | 340/825.31 X |
| 5,397,884 | 3/1995 | Saliga | 340/825.31 X |
| 5,477,214 | 12/1995 | Bartel | 340/825.31 |

FOREIGN PATENT DOCUMENTS

| | | |
|---|---|---|
| 0 034 230 | 8/1981 | European Pat. Off. . |
| 0 596 401 | 11/1994 | European Pat. Off. . |
| 90/08242 | 7/1990 | WIPO . |

OTHER PUBLICATIONS

European Search Report, Jul. 10, 1995.

*Primary Examiner*—Brian Zimmerman
*Assistant Examiner*—William H. Wilson, Jr.
*Attorney, Agent, or Firm*—Morgan & Finnegan, LLP

[57] ABSTRACT

A code locking mechanism that transmits information between a key and a locking mechanism secured against interception misuse, but flexible with respect to original equipment, replacement parts, and emergency functions, is obtained if the key code is, in each case, cryptographically encoded through a hardware encoder. When the locking mechanism is first operated, a control element, inductively coupled to a locking mechanism read-write unit with a new key once and in a non-overwritable manner, transmits an indent number to the object memory. Object-specific identity data are also stored in the control element. With the latter, a key number from a key register of the control element is combined with the key code to read the latter together with a roll-in random code into the set of first still-neutral keys and into the object memory. Thus, a key is valid only if the object-specific identity data are taken into account in its key code. This is possible only through programing via a credit card-like control element which, as the only valid specimen, once has been allocated to the specific object in a fixed way after the locking mechanism is operated, or a component is replaced.

9 Claims, 1 Drawing Sheet

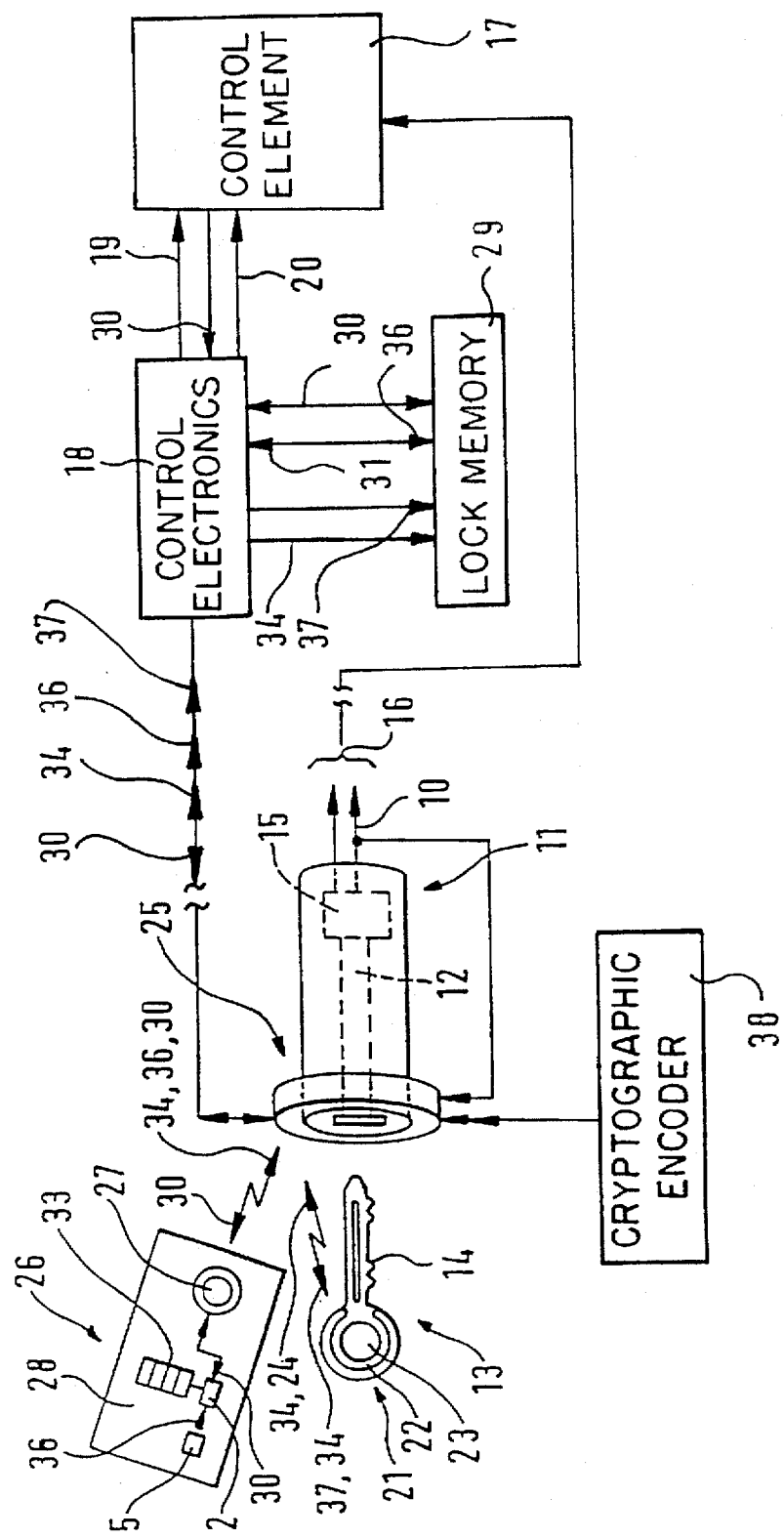

ELECTRONIC CODE LOCKING MECHANISM, ESPECIALLY THE DEACTIVATION OF A MOTOR DRIVE INTERLOCK

BACKGROUND OF THE INVENTION

The invention relates to an electronic code locking mechanism according to the introductory part of claim 1.

In connection with the electronic door lock described in the article "Programmable Without Computer" (page 6 of trade association publication "interkey-sicher", No. 13/1993), a memory chip that is inductively connectable to a lock memory is arranged on the tip of the blade of the key. By means of a control element in the form of a special programming key, the memory of the lock is once set to the code of the key, the code being stored in the allocated (user) key as well. In the same way, the information can be erased again from the memory of the lock by means of an erase key in order to allocate such memory subsequently to another key code. However, the security standard so achievable remains to be low, comparatively speaking, because it is basically possible to intercept a wireless transmission of information by means of an external receiving element, which means it is possible to simulate the key by wireless re-entry of the intercepted key code. Furthermore, the fact that the programming key can be freely used for setting up any type of lock memory in any desired number represents a high security risk due to the lack of object-specific control functions. Most of all, however, an existing logistic problem is to obtain a replacement if the (user) key—which is allocated to the programming key in a fixed way—has been lost or copied in an unauthorized manner.

SUMMARY OF THE INVENTION

Realizing such circumstances, the present invention is, therefore, based on the technical problem of eliminating or, in any case, drastically limiting such logistic problems in connection with an electronic code locking mechanism according to the generic type.

According to the invention, the problem is substantially solved in that the characterizing features of the main claim are realized in connection with the code locking mechanism of the generic type as well.

According to said solution, any allocation of a key is possible only if the control element is allocated to the object as well, and then always remains linked to the object.

Preferably, the object is a motor vehicle whose drive interlock, the latter effectively securing such vehicle against theft when it is parked, can be deactivated only by means of an ignition key of the conventional type known per se; however, with a key code memory with a transponder being additionally accommodated within the zone of the handle of the a key, the memory being capable of communicating with a read-write unit on or within the closer vicinity of the lock. For this purpose, energy is inductively transmitted from the transponder of the lock to the transponder of the key preferably within the range of transition between the long-wave and the medium-wave radio bands of the electromagnetic radiation spectrum, in order to activate there the reading (and, if need be, also writing) circuit for the key memory for calling in information, in the way it is known as such, e.g. from the technology of the inductively operated transponders, and described in greater detail in the article by R. Jurisch, "Identification: Contactless Via High Frequency", published in Elektronik Heft September 1993, pp. 86 ff. However, the object may comprise stationary installations as well, which are to be made accessible or inaccessible by means of a key code that is available only to the authorized user.

In addition to the programming expenditure described in the earlier publication forming the present type, a problem associated with the realization of conventional coded key systems is—as compared to conventional mechanical locks—primarily the logistics bottleneck that occurs when the lock is changed or the key is lost. Such bottleneck, like the security risk that is associated with any open data transmission that is exposed to interception, and including the problems associated with the key-and-object allocation, is now overcome by the solution according to the invention, which no longer requires any logistic expenditure (as compared with existing, purely mechanical locking systems), and which permits the authorized user of the key to resolve, in a conventional way, all the important problems—as they may occur in everyday life—on his own without interrupting the chain of security functions of the system at some point, or without permitting such chain to be by-passed.

This is effected with a data communication by means of the read-write unit allocated to the locking mechanism with its intelligent coupling function between the key or the control transponder, on the one hand, and the memory of the object, on the other hand. As a precautionary measure, each wireless data interchange is encoded cryptographically, so that the data obtained in any unauthorized way is no longer usable. With keys having read-write transponders and read-write memories, all important information required for generating permissible key codes is—following installation in the object for the first time—stored in a control element, which is available to the authorized user, for example in the same way as a vehicle registration certificate. This means that only the user can cause replacement keys to function in limited numbers as needed (for example if a key has been lost) until the lock manufacturer or outfitter of the object makes a fresh or new control element (which is solely usable thereafter) available to such user. Furthermore, by means of such control element or through the exchange of the latter, it is possible to render the complete set of keys previously admissible null and void, which represents an important safety aspect in case of loss or if theft is suspected. Only the owner of the control element that is always the only one valid has and retains access to the safety chain, so that the safety chain can neither be by-passed or overcome in any unauthorized way either, for example via workshops.

A cryptographic algorithm realized in connection with the read-write unit effects a code change with each use of the key, so that a transmission protocol, if it has been intercepted once in any unauthorized way, is no longer usable later. With a key fitted with a read-write transponder and a read-write memory, a roll-in (pseudo) random code can be newly entered in the memory of the key and in the memory of the lock after each use of the key. This represents an additional safety measure.

Recoding of keys is possible only if the read-write unit at the same time comprises—in addition to a key transponder—the transponder of the control element as well, the latter being authorized by a separate object identification.

The transmitting and receiving functions for the transponder data interchange, the cryptographic algorithm in terms of hardware, as well as, if need be, a microprocessor for the function of the control electronics are realized in an integrated circuit in the read-write unit of the lock, which is associated with the object in a fixed way. In addition to the external transmitter-receiver coil (transponder antenna), the lock or object memory can be externally connected to the circuit as well. The control electronics supplied by the read-write unit is designed in a way such that it is possible not only to compare received data with stored data with respect to conformity, but also to determine whether any information has already been allocated once to a transponder memory previously, or whether such memory is newly used, and for that reason has to be supplied first with object-specific safety data.

Additional further developments and alternatives, as well as additional features and advantages of the invention are disclosed in the other claims, and also in the following description of a preferred functional example relating to the solution according to the invention, such example being sketched in a highly abstract way as a single-pole block schematic diagram that is limited to the essential, taking into account the explanations contained in the final abstract as well. The only figure of the drawing shows the memories in the control element, in the key and in the lock, the memories communicating with each other via the object-specific read-write unit.

BRIEF DESCRIPTION OF THE DRAWING

The electronic code locking mechanism 11 sketched in the drawing is, for the present preferred example of realization, shown as a conventional locking cylinder 12 for a key 13 having the serrated profile 14 of its blade. An attached lock switch 15 simultaneously and/or successively—depending on the actual rotary position of the key—supplies the control information 16 (signal or power level) to a least one control element 17. The latter may be a part of the engine electronics of a motor vehicle drive, but can also be, for example a release control for rotary crosses, self-locking doors, or other functional or control devices. However, such control elements 17 becomes active or can be actuated only when a control electronics 18 supplies a release signal 19. Otherwise, and especially when the control electronics 18 supplies a blocking signal 20, the function of the control elements 17 is blocked in the secured position. Depending on the case of application of the code locking mechanism 11, such secured position may involve, for example the drive interlock engaging the engine management of a motor vehicle; the securing of a door to protect a (stationary or mobile) space against unauthorized access; or, for example the release of an emergency exit.

Therefore, the release signal 19 must be generated only when the locking mechanism 11 is actuated by an authorized, i.e., by an object-specifically allocated key 13. In any case, such allocation can be defined in the conventional way via the serrated profile 14, however, according to the present invention, such allocation is particularly (and additionally, if necessary) defined in that the key 13 is equipped, in its handle 21 not immersing in the locking cylinder 12, with a transponder 22 for the wireless transmission of a stored code 24 to a read-write unit 25 on the locking mechanism 11. The control electronics 18, which is functionally part of the read-write unit 25, is—in the preferred case of application as a motor vehicle drive interlock—an equipment component of the engine electronics. For such a case of application, the read-write unit 25 can be integrated preferably in an information system, or in the central locking electronics of the vehicle.

The locking mechanism is normally designed to be actuated with a set of several (for example four) identical keys 13, which can be distributed to authorized persons. In addition to the coded keys 13, a control element 26 with the transponder 27 is associated with the individual lock memory 29. However, as opposed to the key 13, the control element is not inserted in the locking mechanism 11, but has to be brought only into the vicinity of the read-write unit 25 of the locking mechanism 11. Therefore, the control element 26 can be designed, for example in the form of a pendant, a badge, or preferably—as shown—of a card 28 of the type of a credit card, in order to serve as the carrier element especially for its transponder 27. The interrogation algorithm of the read-write unit 25 is designed in such a way that it is capable of accommodating the transponder 22 of the key and the control transponder 27.

DETAILED DESCRIPTION OF THE PREFERRED EMBODIMENT

At the time the object is completed (i.e., for example at the end of an assembly line of a motor vehicle production plant, or upon installation of the door of a building), such object being equipped with the locking mechanism 11 and the control electronics 18 in front of its control elements 17, the object-specific data 30 (such as the chassis or engine number of a motor vehicle, or the order or object number on the building construction sector) are read into its volatile memory 29 and additionally transmitted—for example inductively via the control electronics 18 and by means of the read-write unit 25 of the locking mechanism 11—to a nonvolatile memory 32 of the control element 26 via the control transponder 27. Such a card 28, which is programmed with the product-specific or location-specific identification data 30, can thus assume in the future the function of an access ID-card or of a motor vehicle registration certificate.

Moreover, a number (e.g. eight at the most) binary-coded key codes 34 of the keys 13—which have been previously equipped already with such codes by the manufacturer—can be transmitted by means of the read-write unit 25 into a corresponding multi-digit key register 33 of the control element 26, or already stored fixed on the card 28 by the manufacturer.

In the first case, the keys 13 need to be equipped only with a read-only transponder 22 and the volatile memory 23. For allocating the control element 26, one of the keys of the current set of keys 13 is inserted in the locking mechanism 11, and its key code 34 is transmitted via the read-write unit 25 of the first position of the key register 33, as well as to the memory 29 of the locking mechanism. Otherwise, one of the key numbers made available by the manufacturer in the key register 33 of the control element 26 is transmitted—as the key code 34—via the read-write unit 25 to the memory 23 of the still-uncoded key 13, in combination with the object-specific identity data 30 just transmitted to the control element 26, if the blade of such key 13 has switched the locking switch 15 to the read-status, and if the read-write unit 25, upon interrogating the key transponder 22, has determined that no key code 34 has been entered as yet in its memory 23. In this way, all mechanically fitting but still neutral (in terms of encoding) keys 13 of the set to be allocated to the locking mechanism 11 are programmed one after the other with the first key code 34—which has been present by the control element 26—by simply inserting the keys one after the other in the locking mechanism 11 and turning the key in the latter for the purpose of actuating the locking mechanism switch 15, while the control element 26, too, is sufficiently close (in terms of space) to the read-write unit 25 of exactly the locking mechanism 11 for the high-frequency transmission.

In addition, in the course of such pairing, the currently valid key code 34 interchanged between the key 13 and the control element 26 is stored by the read-write unit 25 in the memory 29 of the locking mechanism. Due to the fact that in this process, the control element 26 acknowledges for the locking mechanism memory 29 also the object-specific identification data 30, the initially neutral read-write unit 25 is now associated in a fixed way via its memory 29 with the control element 26, with the object, and with the keys 13.

The control element 26, furthermore, has an ident generator 35 which, when a key code 34 is called in for the first time, transmits at the same time via the read-write unit 25 its ident number 36 to the control electronics 18 in order to once and finally overwrite in this way in the memory 29 a set-up code 31, the latter being predetermined for the first start-up. In this way too, said individual control element 26 is associated in a fixed way with the object-specific control electronics 18 because any new overwriting of the respective position in the memory 29—for example for any later adaptation of the control electronics 18 to another control element 26—is excluded in terms of circuit engineering.

Owing to the fact that the allocation patterns involve wireless transmissions, it is basically not possible to exclude that an unauthorized person intercepts the data communication traffic by means of such person's own transponder brought close to the system, and in this way obtains, by electric storing of the code, for example an electronic key imitation. In order to prevent such person from any later unauthorized triggering of the release signal 19 of the control electronics 18 with the switch 15 in a bridged condition, the transmission of the key code 34 (thus the combination of the currently valid key number and the object-specific identification data 30 previously read in) takes place via a cryptographic code that changes after each actuation of the key. In each case, said cryptographic code is transmitted by a cryptographic encoder 38 of the read-write unit 25 to the external transponder 22, 27 in the key and respectively in the control element 26 specifically for the data transfer to come, in order to encipher with the code the directly following transmission of information. Therefore, even if an unauthorized person were able to intercept the code, which is generated in terms of hardware, this would be of no use to such person because each interchange of information takes place via the read-write unit 25, and a new code is present by the unit for the next interchange of information.

Moreover, the key code 34 can be additionally provided with a quasi-random code 37 if the keys 13 are equipped with the read-write transponders 22 and the nonvolatile memories 23. For this purpose, the read-write unit 25, when a key code 34 is allocated, additionally generates a roll-in random code 37 (or at least a pseudo-random code 37), which is stored via the control electronics 18 in the memory 29 as well if and as long as the same control element 26 is kept available sufficiently close (for the data interchange) to the read-write unit 25 of the allocated locking mechanism 11.

Now, as soon as the owner of a key 13 so programmed activates in the locking mechanism 11 via the locking mechanism switch 15 (for example in the ignition key position "radio" or "ignition") the operating signal 10, the key 13 is treated as "authorized" by the read-write unit 25 of the locking mechanism 11 if the control electronics 18 recognizes the key code 34 (and, if need be, additionally the random code 37 individually allocated to said set of keys 13) on the basis of the data preset in the memory 29 of the locking mechanism. In case of matching, the control electronics 18 supplies the release signal 19, so that it is possible, for example to start an engine, or to release an electromagnetic door lock.

In the event a key 13 fits mechanically with respect to the serrated profile 14 but such key is invalid with respect to the key code 34 and to the current random code 37, if any, the control electronics 18 prevents generation of a release signal 19, or a separate blocking signal 20 is triggered in order to indicate a manipulation attempt, for example by emitting or storing a signal, or to trigger an additional security locking system.

Should a key 13 get lost, the previous key code 34 in the memory 29 of the locking mechanism is erased as a precautionary measure by being called in by the control element 26. As heretofore, the vehicle owner may then order a set of replacement keys by submitting papers documenting his authorization (such as, for example directly the object-specifically marked control element 26), such set of replacement keys having a serrated profile 14 which mechanically fits the locking mechanism 11. If only a read-transponder 22 is available on the key 13, such key is again equipped by the manufacturers with a key code 34, which is transmitted by the read-write unit 25 to its memory 29 and to the next, still unused register position of the control element 26, the latter being covered by such transmission at the same time and being allocated object-specifically. Otherwise, the read-write unit 25 determines whether a previously unused key number is still available in the register 33 for future key sets, marks such number as now being used (or erases it), and transmits the key number (combined with the key code 34) to the locking mechanism memory 29 and to the read-write memory 23—the letter having been recognized as previously blank—of the replacement key 13 to be currently programmed.

Such procurement of replacement keys can be repeated as often as new codes 34—which are to be called in from already—programmed keys 13—can still be stored in the control element 26, or until the last of the key numbers present on the control element 26 has been used. Thereafter, and also after a control element 26 has been lost, a new control element 26 with an again fully available register 33 has to be allocated to the specific object via the identity data 30. As the read-write unit 25 has already been used once previously for the transfer of key codes 34 in connection with another control element 26, the ident generator 35, for example, in the (new) control element 26 is modified by the read-write unit 25 in a way such that the following now can be recognized from the ident number 36. The control element 26 present is the only permissible control element 26 for this locking mechanism 11, but it is no longer the control element 26 that had been allocated originally. The (old) ident number 36 becomes unusable in this way, so that no unauthorized person can later encode a key 13 with the (for example stolen or found) original control element 26. The object-specific identity data 30, which are accessible only to the manufacturer of the object and its control element 26, assure that not some control element 26 obtained somewhere can be used for recoding additional keys 13, but only that control element 26 in which the manufacturer has already entered the object-specifically valid identity data 30, because no object-specific identity data 30 can be transmitted later to another control element 26 by a read-write unit 25 that has been operated once before.

In this way, a set of keys 13 that has been coded once before can be finally rendered unusable by merely exchanging the control element 26, because for security reasons, the content of its memories 23 cannot be overwritten by a new key code 34.

If the read-write unit 25 installed in or on the locking mechanism 11 or within the vicinity of the latter should become unusable on account of a technical defect and have to be replaced for that reason, the new read-write unit 25 transmits the ident number 36 of the control element 26—the latter being kept available nearby—to the control electronics 18 in combination with a new random code 37, and writes the number into the memory 29 provided that the ident number 36 actually read out by the control element 26 matches the only already stored, which means the object-specific allocation of the control element 26 continues to be assured.

If the functional range in which the control electronics 18 is included or covered (for example the engine management electronics) has to be replaced, the random code 37 allocated the last time, and also the object-specific ident data are not as yet available to the object memory 29 being replaced at the same time, so that the release signal cannot be generated even with a key 13 that has been allocated per se. However, the original set-up code 31 now indicating the spare part exchange is then still contained in the new object memory 29. When the control element 26 is interrogated for the first time, the set-up code 31 is overwritten with its ident number 36 (which, as stated above, is possible only when the first communication contact of the control element 26 occurs after the spare part has been installed). By virtue of such transmission of the ident number 36, the read-write unit 25 automatically generates a new random code 39, which is stored in the object memory 29 as well. In addition, the key number, the latter having been marked as being current, is transferred from the key register 33 to the new object memory 29 combined with the key code 34. This means that all information is now available in the memory in order to make it possible to determine, via the control electronics 18, the presence of an acceptable key 13, and to transmit subsequently the release signal 19.

If a validly encoded key 13 is no longer available, but only a key that is mechanically fitting the locking mechanism 11, the release signal 19 can be triggered as an emergency measure with such a key as well if only the control element 26 allocated to the object is present within the reception range of the antenna of the locking mechanism, i.e., of the read-write unit 25. For this reason, the coded control element 26 normally has to be carefully safeguarded against unauthorized access, like a motor vehicle registration certificate or a credit card.

What is claimed is:

1. Electronic code locking mechanism with wireless information transmission between a read-write unit with an object memory, and a key with a transponder, whereby provision is made for a control element for the allocation of a code between the key and the locking mechanism comprising a key memory, and an object-specific identification data memory in the control element for first-time allocation to the locking mechanism.

2. Locking mechanism according to claim 1, further comprising a key register, via the read-write unit, a key number is readable out from a supply in said key register of the control element in combination with the identification data and transmittable to the key memory as a key code.

3. Locking mechanism according to claim 1, wherein the read-write unit further comprises a cryptographic encoder for the transmission of information, said transmission takes place with a cryptographic coding preset by the read-write unit.

4. Locking mechanism according to claim 1, wherein the control element further comprises a control element transponder, the read-write unit communicates with the key transponder and said control element transponder when stored information is changed.

5. Locking mechanism according to claim 1, wherein the object memory further comprises a code for a new set-up, and an indent number individualizing the control element for only once overwriting said new set-up code.

6. Locking mechanism according to claim 1 further comprising a new control element, the read-write unit individualizing said new control element in order to render said new control element as a solely admissible control element when its externally preset object-specific data are identical to identity data stored in the object memory.

7. Locking mechanism according to claim 1, wherein the control element is a flexible card with object-specific identity data stored in the control element in a non-overwritable way.

8. Locking mechanism according to claim 1, further comprising a roll-in random code, the key code transmission from the control element to the object memory and to the key memory being linked with said roll-in random code.

9. Locking mechanism according to claim 1, wherein the key memory further comprises a read-only memory, the locking mechanism having a memory, the individual key codes being transmittable to said locking mechanism memory from said key read-only memory via the read-write unit in the presence of the control element.

* * * * *